(12) United States Patent
Jung et al.

(10) Patent No.: US 11,535,734 B2
(45) Date of Patent: Dec. 27, 2022

(54) JOINING MATERIAL FOR LASER WELDING AND LASER WELDING METHOD USING THE SAME

(71) Applicants: LG CHEM, LTD., Seoul (KR); LG HAUSYS, LTD., Seoul (KR)

(72) Inventors: Jin Mi Jung, Daejeon (KR); Chun Ho Park, Daejeon (KR); Jae Jung Yoo, Daejeon (KR); Yu Jin Jeong, Daejeon (KR); Seung Yong Lee, Daejeon (KR); Soo Min Lee, Daejeon (KR); Bu Won Son, Daejeon (KR); Bu Gon Shin, Daejeon (KR)

(73) Assignees: LG CHEM, LTD., Seoul (KR); LG HAUSYS, LTD., Seoul (KR)

( * ) Notice: Subject to any disclaimer, the term of this patent is extended or adjusted under 35 U.S.C. 154(b) by 31 days.

(21) Appl. No.: 16/769,051

(22) PCT Filed: Dec. 7, 2018

(86) PCT No.: PCT/KR2018/015501
§ 371 (c)(1),
(2) Date: Jun. 2, 2020

(87) PCT Pub. No.: WO2019/112362
PCT Pub. Date: Jun. 13, 2019

(65) Prior Publication Data
US 2021/0230413 A1    Jul. 29, 2021

(30) Foreign Application Priority Data
Dec. 7, 2017    (KR) .................... 10-2017-0167726

(51) Int. Cl.
*B29C 65/16*     (2006.01)
*C08L 23/14*     (2006.01)
(Continued)

(52) U.S. Cl.
CPC .......... *C08L 23/14* (2013.01); *B29C 65/1616* (2013.01); *B29C 65/1635* (2013.01);
(Continued)

(58) Field of Classification Search
CPC . B29C 65/1635; B29C 65/16; B29C 65/1677; B29C 66/71; B29C 66/7212;
(Continued)

(56) References Cited

U.S. PATENT DOCUMENTS

2003/0130381 A1\* 7/2003 Joachimi ................. B29C 66/71
                                                                 524/88
2009/0130451 A1   5/2009 Farrell
2011/0230608 A1\* 9/2011 Takeuchi ................. C08J 3/226
                                                                524/147

FOREIGN PATENT DOCUMENTS

CN        101735508 A      6/2010
DE     20 2013 011 79 U1   7/2014
(Continued)

OTHER PUBLICATIONS

Machine Translation of JP-2011116933-A (Year: 2011).\*

*Primary Examiner* — Daniel McNally
(74) *Attorney, Agent, or Firm* — Dentons US LLP (57) ABSTRACT

A joining material for laser welding, a laser welding method using the same, and a laser joined body using the laser welding method. The joining material includes a polymer matrix and a needle-shaped inorganic filler. The polymer matrix includes a polypropylene resin having a melt index of 80 g/10 min or more to 95 g/10 min or less as measured at a temperature of 230° C. and a load of 2.16 kg, and the needle-shaped inorganic filler has an aspect ratio of 10:1 to 20:1.

15 Claims, 9 Drawing Sheets

(51) Int. Cl.
*B29C 65/82* (2006.01)
*B29C 65/00* (2006.01)

(52) U.S. Cl.
CPC ...... *B29C 65/1661* (2013.01); *B29C 65/1674* (2013.01); *B29C 65/1677* (2013.01); *B29C 65/8215* (2013.01); *B29C 65/8253* (2013.01); *B29C 66/1122* (2013.01); *B29C 66/71* (2013.01); *B29C 66/7212* (2013.01); *B29C 66/72143* (2013.01); *B29C 66/7312* (2013.01); *B29C 66/73921* (2013.01); *B29C 66/9161* (2013.01); *C08L 2205/03* (2013.01)

(58) Field of Classification Search
CPC .......... B29C 66/72143; B29C 66/7312; B29C 66/73921; B29C 66/9161; C08L 23/14; C08L 2205/03
See application file for complete search history.

(56) References Cited

FOREIGN PATENT DOCUMENTS

| | | | | |
|---|---|---|---|---|
| JP | 2003183524 A | | 7/2003 | |
| JP | 2009114249 A | | 5/2009 | |
| JP | 2011116933 A | * | 6/2011 | ......... B29C 65/1677 |
| JP | 2011116933 A | | 6/2011 | |
| JP | 2012241056 A | | 12/2012 | |
| JP | 5386436 B2 | | 1/2014 | |
| JP | 2014189049 A | | 10/2014 | |
| JP | 2015127405 A | | 7/2015 | |
| KR | 10-19970070085 A | | 11/1997 | |
| KR | 10-20060041312 A | | 5/2006 | |
| KR | 10-20080046575 A | | 5/2008 | |
| WO | 2005068555 A1 | | 7/2005 | |

* cited by examiner

JOINING MATERIAL FOR LASER WELDING AND LASER WELDING METHOD USING THE SAME

CROSS-REFERENCE TO RELATED APPLICATIONS

This application is a U.S. national stage of international application No. PCT/KR2018/015501 filed Dec. 7, 2018, and claims priority to and the benefit of Korean Patent Application No. 10-2017-0167726 filed in the Korean Intellectual Property Office on Dec. 7, 2017, the entire contents of which are incorporated herein by reference.

TECHNICAL FIELD

The present invention relates to a joining material for laser welding, a laser welding method using the same, and a laser joined body manufactured by using the same.

BACKGROUND

Recently, materials for parts have been replaced with plastics to reduce the weight in various industrial fields such as transportation devices such as automobiles, electronics, and mobile devices. Furthermore, various methods have been attempted to bind these plastic material parts. Examples of representative joining methods include a method using mechanical fasteners such as screws or rivets, a joining method using a bonding agent, a vibration welding method, an ultrasonic welding method, and the like.

Among the various joining methods, particularly a method of welding plastic materials using a laser may exhibit an effect which is equivalent to or more than other existing joining methods due to a relatively simple process.

However, in the case of a plastic part including additives such as organic and inorganic fillers for reinforcing physical properties of the plastic material, there is a problem in that the these additives greatly reduce the joining efficiency by dispersing or absorbing energy during laser transmission. Furthermore, in the case of a plastic material having high crystallinity, there is a problem in that the joining efficiency is reduced by scattering or absorbing energy during laser transmission to decrease and disperse energy that reaches the interface between parts.

Therefore, there is a need for developing a material for a plastic part, which is capable of being welded by using a laser and has excellent mechanical properties.

RELATED PATENT DOCUMENT

Korean Patent Application Laid-Open No.: KR 10-2015-0116669 A

SUMMARY

The present invention has been made in an effort to solve a problem in that the joining efficiency of laser welding is reduced by an additive included in a plastic material, and to provide a joining material for laser welding in which laser welding with a material to be joined may be effectively achieved, and a laser welding method using the same.

However, a problem to be solved by the present invention is not limited to the aforementioned problem, and other problems that are not mentioned may be clearly understood by a person skilled in the art from the following description.

An exemplary embodiment of the present invention provides a joining material for laser welding, including: a polymer matrix including a polypropylene resin having a melt index of 80 g/10 min or more to 95 g/10 min or less as measured at a temperature of 230° C. and a load of 2.16 kg; and a needle-shaped inorganic filler having an aspect ratio of 10:1 to 20:1.

Another exemplary embodiment of the present invention provides a laser welding method including: preparing the joining material for laser welding; laminating the joining material for laser welding and at least a part of a material to be joined; and irradiating laser to form a welding region in a region where the joining material for laser welding and the material to be joined are laminated, wherein the laser is irradiated to pass through the joining material for laser welding toward a surface of the material to be joined.

Still another exemplary embodiment of the present invention provides a laser joined body manufactured by the laser welding method.

A laser joined body manufactured by using a joining material for laser welding according to an exemplary embodiment of the present invention has excellent mechanical strength, and thus may be utilized as a part for various instruments.

The laser joined body according to an exemplary embodiment of the present invention has an advantage in having excellent flexural modulus and joining strength.

The laser joining material according to an exemplary embodiment of the present invention may effectively achieve laser welding with a material to be joined by minimizing dispersion and/or internal scattering of energy during the irradiation of laser.

DETAILED DESCRIPTION

Throughout the present specification, when one member is disposed "on" another member, this includes not only a case where the one member is brought into contact with another member, but also a case where still another member is present between the two members.

Throughout the present specification, when one part "includes" one constituent element throughout the present specification, unless otherwise specifically described, this does not mean that another constituent element is excluded, but means that another constituent element may be further included.

Throughout the present specification, "A and/or B" means "A or B, or A and B".

Throughout the present specification, the unit "parts by weight" may mean a weight ratio between the respective components.

The present inventors have developed the following invention as a result of continuous development of a high-strength plastic material capable of being joined to a material using a laser welding method. Specifically, the present inventors developed a joining material optimized for laser welding by adjusting physical properties of a polypropylene resin and adjusting an aspect ratio of a needle-shaped inorganic fill for implementing high hardness physical properties, and confirmed that a joining material for laser welding as described above could be applied to various products.

Hereinafter, the present invention will be described in more detail.

An exemplary embodiment of the present invention provides a joining material for laser welding, including: a polymer matrix including a polypropylene resin having a melt index of 80 g/10 min or more to 95 g/10 min or less as measured at a temperature of 230° C. and a load of 2.16 kg; and a needle-shaped inorganic filler having an aspect ratio of 10:1 to 20:1.

According to an exemplary embodiment of the present invention, for the joining material for laser welding, the needle-shaped inorganic filler may be dispersed in the polymer matrix including the polypropylene resin.

The joining material for laser welding may have excellent mechanical stiffness and impact resistance because the needle-shaped inorganic filler is appropriately dispersed in the polymer matrix to increase the degree of crystallinity of the joining material for laser welding. Furthermore, the joining material for laser welding has an advantage in that the joining material for laser welding can be applied to various products because excellent mechanical properties may be implemented even in a small thickness.

According to an exemplary embodiment of the present invention, the polypropylene resin may include at least one of a propylene homopolymer; an ethylene-propylene copolymer; a copolymer of propylene and an olefin-based monomer having 4 to 10 carbon atoms; and a block copolymer of polypropylene and an ethylene-propylene rubber. Specifically, the polypropylene resin may include an ethylene-propylene copolymer.

According to an exemplary embodiment of the present invention, in the ethylene-propylene copolymer, a content of an ethylene repeating unit may be 3 wt % or more to 10 wt % or less.

Since the ethylene-propylene copolymer includes a relatively small content of an ethylene repeating unit, it is possible to increase the crystallinity of a polypropylene resin and improve the stiffness and impact resistance of the joining material for laser welding.

According to an exemplary embodiment of the present invention, the polypropylene resin has a melt index of 80 g/10 min or more to 95 g/10 min or less as measured at a temperature of 230° C. and a load of 2.16 kg.

Since the polymer matrix includes a polypropylene resin having a melt index within the above range, the joining material for laser welding including the polymer matrix may have more improved moldability and appearance characteristics and simultaneously may secure high mechanical stiffness. Specifically, when the melt index of the polypropylene resin is less than the above range, the processability may deteriorate because the fluidity of the resin during the injection molding is reduced. Further, when the melt index of the polypropylene resin is more than the above range, the fluidity of the resin during the injection molding is excessive, so that the balance between stiffness and impact resistance of the joining material for laser welding, including the polymer matrix, is reduced, and as a result, mechanical properties may also be reduced.

According to an exemplary embodiment of the present invention, the polymer matrix may include the polypropylene resin in an amount of 40 wt % or more to 90 wt % or less.

When the content of the polypropylene resin is within the above range, the concentration of the needle-shaped inorganic filler is appropriately maintained, so that it is possible to prevent the appearance of a product formed by the joining material for laser welding from being modified by the needle-shaped inorganic filler, and to effectively improve mechanical properties caused by the needle-shaped inorganic filler.

According to an exemplary embodiment of the present invention, the polypropylene resin may have a weight average molecular weight of 50,000 g/mol or more to 500,000 g/mol or less.

When the weight average molecular weight of the polypropylene resin is within the above-range, there is an advantage in that it is possible to minimize deterioration in processability of the joining material for laser welding, and significantly enhance mechanical properties thereof.

According to an exemplary embodiment of the present invention, the needle-shaped inorganic filler has an aspect ratio of 10:1 to 20:1.

By adjusting the aspect ratio of the needle-shaped inorganic filler within the above-described range, dispersion or reflection of energy which may be generated during the laser welding may be minimized, and a suitable molten pool of the joining material for laser welding can be formed by irradiating with a laser.

In the case of the needle-shaped inorganic filler having an aspect ratio of less than 10:1 or more than 20:1, the area of the laser beam reaching the interface with the material to be joined is widened because laser is scattered in the joining material during the irradiation of laser may occur. The result as described above may be responsible for reduction in the strength of laser welding, and may be responsible for deterioration of reliability of a product when the joining material for laser is used as a configuration of the product.

In addition, the aspect ratio of the needle-shaped inorganic filler may be adjusted within the above range to improve the mechanical stiffness of the joining material for laser welding, and the needle-shaped inorganic filler may be uniformly dispersed in the polymer matrix to impart uniform physical properties of the joining material for laser welding.

In the present invention, the aspect ratio of the inorganic filler may be a value of an average length of the inorganic filler with respect to the average width (average diameter) thereof, that is, "an average length/an average width".

Figure 1:
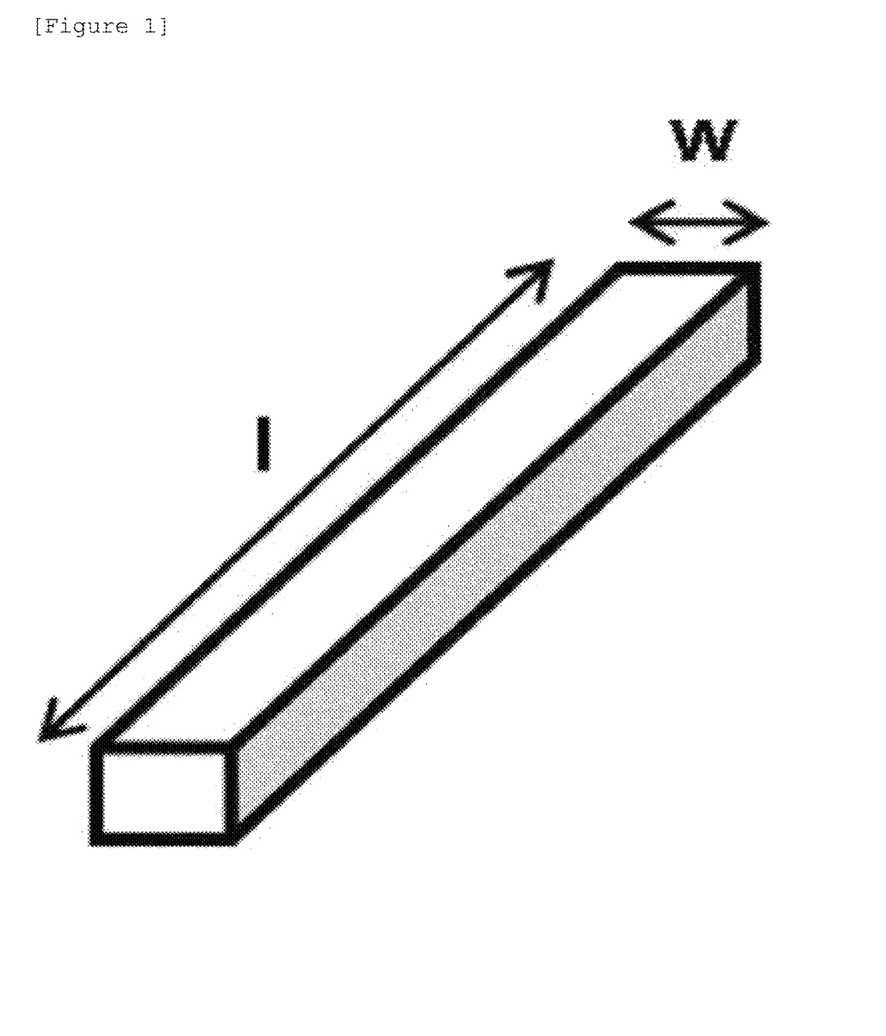
FIG. 1 is a schematic illustration of a needle-shaped inorganic filler.

FIG. 1 is an illustration of the aspect ratio of a needle-shaped inorganic filler. Specifically, when the width (w) of the needle-shaped inorganic filler and the length (l) of the needle-shaped inorganic filler are as illustrated in FIG. 1, the aspect ratio of the needle-shaped inorganic filler may be calculated from the width (w) and the length (l).

In the present invention, the average width and the average length may be measured by photographing a needle-shaped inorganic filler using a scanning electron microscope (SEM), measuring the widths and lengths of 300 to 500 particles at a magnification in which the size of one smallest needle-shaped inorganic filler is 2 mm to 5 mm, and calculating the average values thereof.

Further, according to an exemplary embodiment of the present invention, the needle-shaped inorganic fillers may have an average width (average diameter) of about 5 µm to about 10 µm, and may have an average length of about 30 µm to about 40 µm. An appropriate shape of the needle-shaped inorganic filler may be obtained by adjusting the average width and the average length of the inorganic fillers. In addition, when the joining material for laser welding is irradiated with a laser, the scattering of laser may be minimized.

According to an exemplary embodiment of the present invention, the needle-shaped inorganic filler may include at least one of magnesium oxysulfate-based, magnesium silicate hydrate-based, and calcium silicate-based particles. Specifically, according to an exemplary embodiment of the present invention, the needle-shaped inorganic filler may include a wollastonite particle as a calcium silicate-based particle.

According to an exemplary embodiment of the present invention, a content of the needle-shaped inorganic filler may be 5 parts or more by weight to 30 parts or less by weight based on 100 parts by weight of the joining material for laser welding. Specifically, the content of the needle-shaped inorganic filler may be 8 parts or more by weight to 25 parts or less by weight, 10 parts or more by weight to 20 parts or less by weight, or 12 parts or more by weight to 16 parts or less by weight, based on 100 parts by weight of the joining material for laser welding.

When the content of the inorganic filler is within the above range, the joining material for laser welding may be effectively joined to a material to be joined during the laser joining process, and furthermore, the mechanical stiffness of the joining material for laser welding may be secured.

According to an exemplary embodiment of the present invention, the polymer matrix may further include a thermoplastic elastomer.

The thermoplastic elastomer may impart impact resistance and heat resistance to the joining material for laser welding.

According to an exemplary embodiment of the present invention, the thermoplastic elastomer may include a block copolymer of ethylene and α-olefin having 4 to 30 carbon atoms.

According to an exemplary embodiment of the present invention, the α-olefin having 4 to 30 carbon atoms may include at least one α-olefin compound of 1-butene, 1-pentene, 4-methyl-pentene, 1-hexene, 1-heptene, 1-octene, 1-decene, 1-undecene, 1-dodecene, 1-tetradecene, 1-hexadecene, and 1-eicosene.

According to an exemplary embodiment of the present invention, a molar ratio of the ethylene to the α-olefin of the block copolymer of ethylene and α-olefin having 4 to 30 carbon atoms may be 6:4 to 7:3.

According to an exemplary embodiment of the present invention, the block copolymer of ethylene and α-olefin having 4 to 30 carbon atoms may include at least one of an ethylene-1-octene block copolymer and an ethylene-1-butene block copolymer.

According to an exemplary embodiment of the present invention, the thermoplastic elastomer may have a melt index of 0.5 g/10 min or more to 10 g/10 min or less as measured at a temperature of 190° C. and a load of 2.16 kg. Specifically, the ethylene-1-octene block copolymer may have a melt index of 5 g/10 min or more to 10 g/10 min or less as measured at a temperature of 190° C. and a load of 2.16 kg. Further, the ethylene-1-butene block copolymer may have a melt index of 0.5 g/10 min or more to 3 g/10 min or less as measured at a temperature of 190° C. and a load of 2.16 kg. Since the thermoplastic elastomer has a melt index within the above range, excellent dimensional stability and high impact resistance may be achieved by adjusting the melt index of the joining material for laser welding and having an appropriate fluidity.

According to an exemplary embodiment of the present invention, the thermoplastic elastomer may have a weight average molecular weight of 50,000 g/mol to 180,000 g/mol. Since the thermoplastic elastomer has a weight average molecular weight within the above range, the thermoplastic elastomer has excellent dimensional stability and high impact resistance, so that it is possible to improve physical properties of a polypropylene resin included in the polymer matrix.

According to an exemplary embodiment of the present invention, the thermoplastic elastomer may have a density of 0.8 g/cm$^3$ to 0.9 g/cm$^3$, specifically, 0.86 g/cm$^3$ to 0.87 g/cm$^3$. Since the thermoplastic elastomer has a density within the above range, it is possible to reduce the weight of the joining material for laser welding.

According to an exemplary embodiment of the present invention, a content of the thermoplastic elastomer may be 5 parts or more by weight to 30 parts or less by weight based on 100 parts by weight of the joining material for laser welding.

When the content of the thermoplastic elastomer is within the above range, it is possible to improve the impact resistance and dimensional stability of the joining material for laser welding, and simultaneously prevent the welding efficiency from being reduced during laser welding using the joining material for laser welding.

According to an exemplary embodiment of the present invention, the joining material for laser welding may have a thickness of 0.5 mm or more to 5 mm or less.

When the joining material for laser welding has a thickness within the above range, the injection during the manufacture of the joining material for laser welding may be easily performed. Further, when the joining material for laser welding has a thickness within the above range, the light transmittance during the welding using laser light is extremely low, so that it is possible to prevent the welding strength from being not secured.

According to an exemplary embodiment of the present invention, the joining material for laser welding may have a light transmittance of 20% or more at a wavelength of 980 nm. Specifically, the joining material for laser welding may have a light transmittance of 20% or more to 50% or less, 25% or more to 50% or less, or 20% or more to 40% or less, 20% or more to 30% or less, or 25% or more to 30% or less at a wavelength of 980 nm.

The light transmittance of the joining material for laser welding may have the same meaning of laser transmittance. Furthermore, when the joining material for laser welding has a light transmittance within the above range, during laser welding using the joining material for laser welding, laser light may be effectively transferred to a material to be joined, and accordingly, a high joining strength can be achieved by effectively forming a molten pool.

According to an exemplary embodiment of the present invention, the joining material for laser welding may be used as a material in a product due to excellent stiffness and impact resistance of the joining material for laser welding. Specifically, the joining material for laser welding may be a material for an automotive indoor material such as an instrument panel, a roof, a door, a seat, and a trunk room. However, the joining material for laser welding is not limited thereto, and may be used as a material for parts of various electronic devices, housing, and the like.

Another exemplary embodiment of the present invention provides a laser welding method including: preparing the joining material for laser welding; laminating the joining material for laser welding and at least a part of a material to be joined; and irradiating with a laser to form a welding region in a region where the joining material for laser welding and the material to be joined are laminated, in which the irradiated laser passes through the joining material for laser welding toward a surface of the material to be joined.

Figure 2:
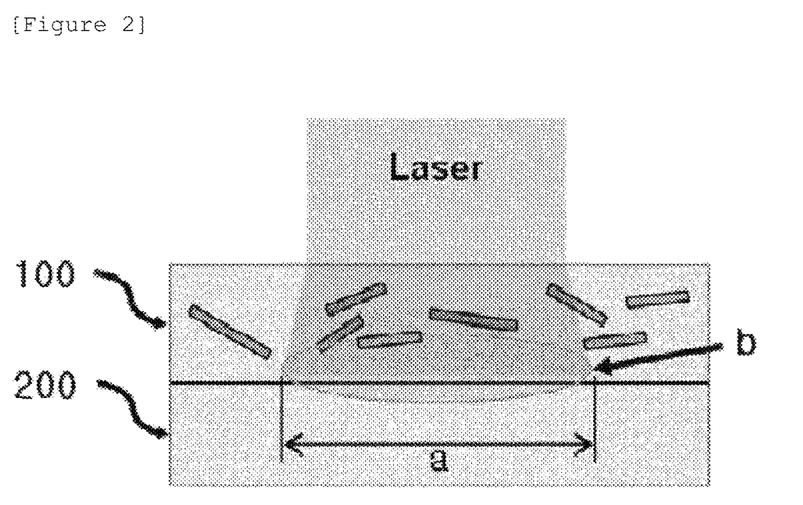
FIG. 2 is a cross-sectional view of a laser joining material, a material to be joined, and irradiation of the joining material and the material to be joined with a laser according to an exemplary embodiment.

FIG. 2 schematically illustrates a laser joining material and a cross-section of a material to be joined during a laser irradiation process according to an exemplary embodiment of the present invention. Specifically, as illustrated in FIG. 2, a joining material for laser welding 100 and a material to be joined 200 are laminated with each other, and laser welded using laser irradiation. In FIG. 2, the bars in the joining material for laser welding 100 indicate a needle-shaped inorganic filler, a is the welding width, and b is the molten pool region.

According to an exemplary embodiment of the present invention, the material to be joined may be a plastic member having a light absorbance of 80% or more at a wavelength of 980 nm. That is, the material to be joined is a plastic member, and may absorb 80% or more of light with a wavelength of 980 nm.

The plastic member as the material to be joined may be the same material as the above-described material for laser welding. Specifically, the plastic member as the material to be joined may include at least one of a propylene homopolymer; an ethylene-propylene copolymer; a copolymer of propylene and an olefin-based monomer having 4 to 10 carbon atoms; and a block copolymer of polypropylene and ethylene-propylene rubber. Furthermore, the material to be joined may include a colorant such as a dye and/or a pigment, if necessary, in order to increase the light absorbance.

According to an exemplary embodiment of the present invention, a total line energy value of the laser is 1.5 J/mm or more to 3 J/mm or less, and the total line energy may be defined by the following Equation 1.

$$E_{tot} = P/v \times \text{the number of repetitions} \quad \text{[Equation 1]}$$

In Equation 1, $E_{tot}$ is the total line energy (J/mm), P is the laser power (W), and v is the laser irradiation rate (mm/s).

According to an exemplary embodiment of the present invention, the total line energy value may be 1.5 J/mm or more to 3.0 J/mm or less.

When a laser has an energy within the total line energy range, the number of repetitions of laser irradiation may be optimized to shorten the process time and improve the attachment force.

According to an exemplary embodiment of the present invention, the wavelength of the laser may be any one wavelength value of 800 nm to 1,200 nm. Specifically, the wavelength of the laser may be 980 nm.

According to an exemplary embodiment of the present invention, the output of the laser may be 50 W or more to 2,000 W or less, and specifically, may be 50 W or more to 100 W or less, or 55 W or more to 70 W or less. The output of the laser may be appropriately adjusted according to the spot size of the laser and the type of material to be joined.

According to an exemplary embodiment of the present invention, the spot size of the laser may be 100 μm to 5,000 μm, and may be appropriately adjusted according to the type of material to be joined.

According to an exemplary embodiment of the present invention, the irradiation rate of the laser may be 10 mm/s or more to 1,000 mm/s or less, specifically 30 mm/s or more to 300 mm/s or less, or 50 mm/s or more to 200 mm/s or less, and may be appropriately adjusted according to the type of material to be joined.

According to an exemplary embodiment of the present invention, the number of repetitions of the laser may be one time to 50 times, specifically 1 time to 10 times, 3 times to 7 times, or 4 times to 7 times, and may be appropriately adjusted according to the type of material which is irradiated with laser.

According to an exemplary embodiment of the present invention, the welding step is a laser transmission joining method, and may irradiate the joining material for laser welding with the laser in a direction of the material to be joined by focusing on the interface between the joining material for laser welding and the material to be joined.

Figure 3:
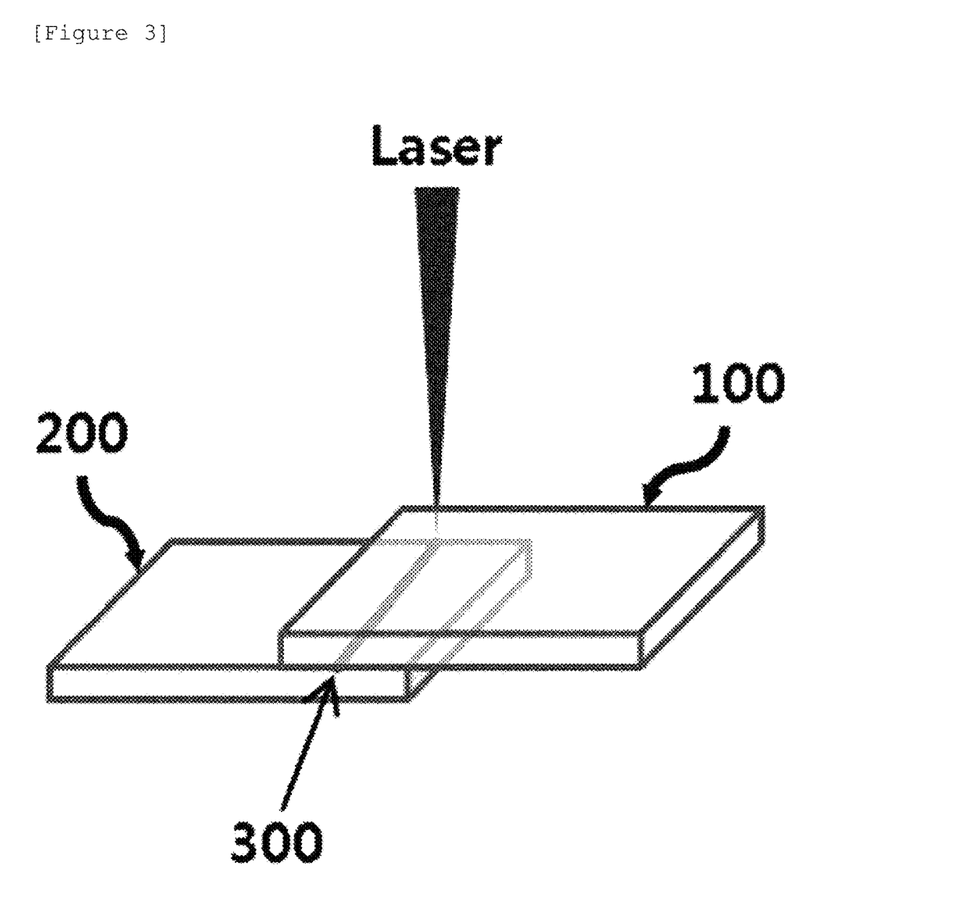
FIG. 3 illustrates a laser welding method according to an exemplary embodiment.
Figure 4:
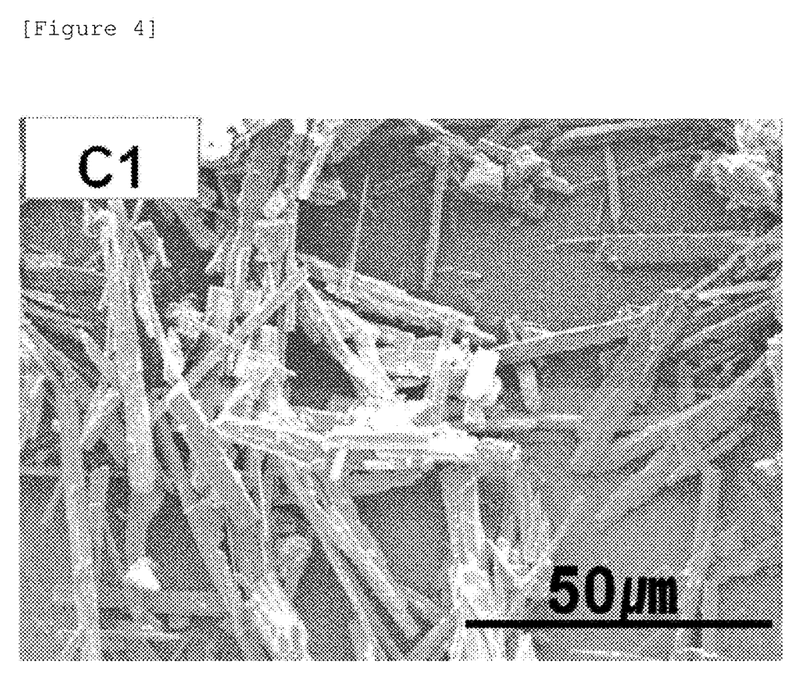
FIG. 4 is a scanning electron microscope (SEM) image of an inorganic filler (C1) according to an exemplary embodiment.
Figure 5:
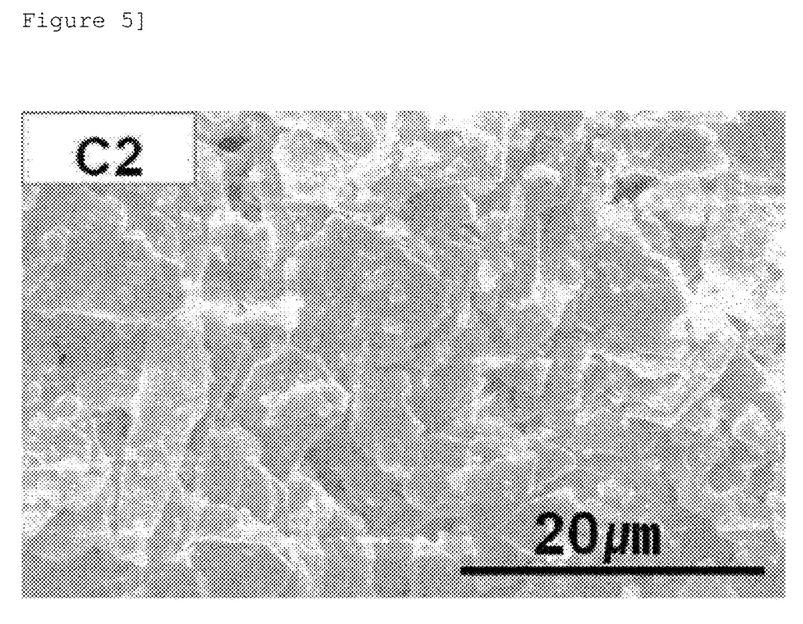
FIG. 5 is a scanning electron microscope (SEM) image of an inorganic filler (C2) according to an exemplary embodiment.
Figure 6:
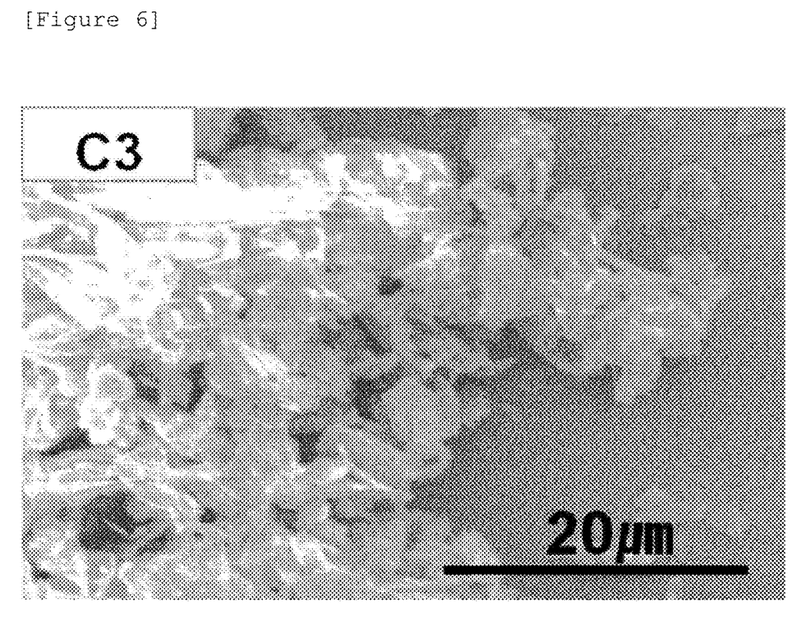
FIG. 6 is a scanning electron microscope (SEM) image of an inorganic filler (C3) according to an exemplary embodiment.
Figure 7:
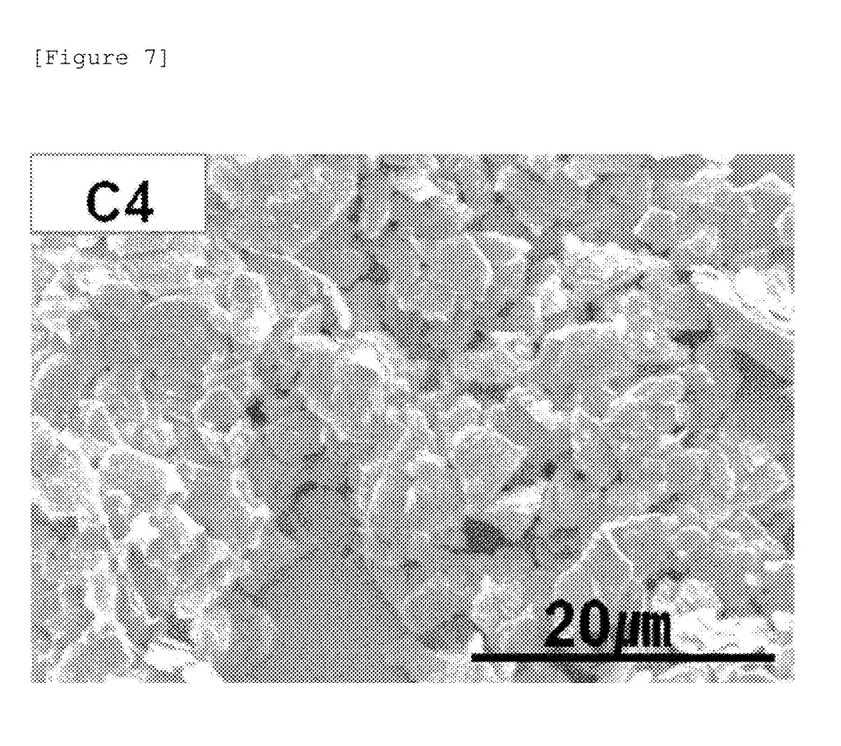
FIG. 7 is a scanning electron microscope (SEM) image of an inorganic filler (C4) according to an exemplary embodiment.
Figure 8:
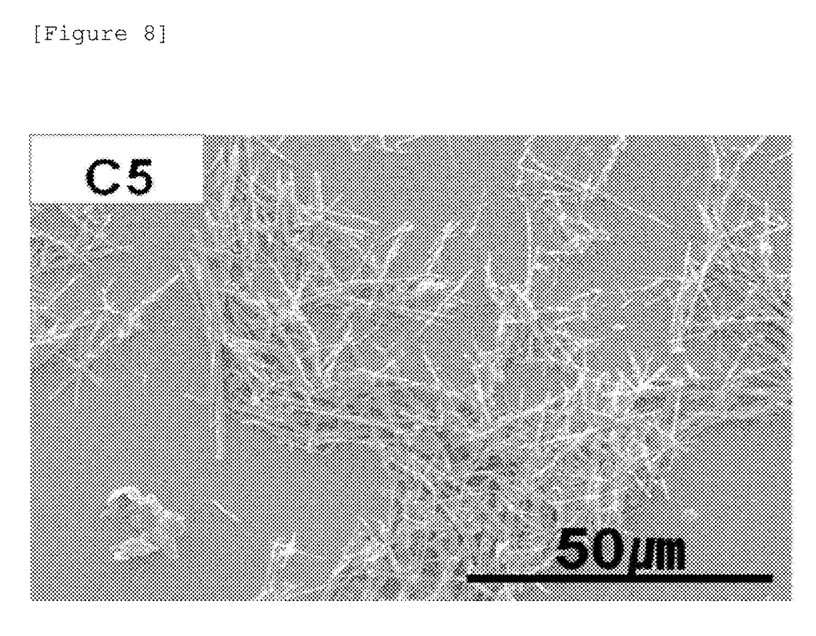
FIG. 8 is a scanning electron microscope (SEM) image of an inorganic filler (C5) according to an exemplary embodiment.

FIG. 3 illustrates a laser welding method according to an exemplary embodiment of the present invention. As illustrated in FIG. 3, a welding region 300 is formed by irradiating a joining material for laser welding 100 with a laser in a direction of a material to be joined 200 by focusing on the interface between the joining material for laser welding 100 and the material to be joined 200.

According to an exemplary embodiment of the present invention, the joining material for laser welding may have a laser transmittance of 20% or more to 50% or less, 25% or more to 40% or less, or 25% or more to 35% or less at a wavelength of 980 nm. Within the laser transmittance range, an excellent attachment force may be implemented during the laser welding using the joining material for laser welding.

An exemplary embodiment of the present invention provides a laser joined body manufactured by the laser welding method. The laser joined body may mean that the joining material for laser welding and the material to be joined are joined by using laser welding.

The laser joined body may be an automotive interior material or a part of an electronic device.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present invention are provided for more completely explaining the present invention to the person with ordinary skill in the art.

Example 1

An ethylene-propylene copolymer (A1) having an ethylene repeating unit content of 7 wt % and a melt index of 90 g/10 min as measured at a temperature of 230° C. and a load of 2.16 kg; an ethylene-1-octene block copolymer (B1) having a melt index of 7.5 g/10 min as measured at a temperature of 190° C. and a load of 2.16 kg; an ethylene-1-butene block copolymer (B2) having a melt index of 1.75 g/10 min as measured at a temperature of 190° C. and a load of 2.16 kg; and a needle-shaped inorganic filler (C1) in the following Table 1 were mixed at a content shown in the following Table 2. A content unit in the following Table 2 is part by weight.

Furthermore, a bonding material for laser welding having a thickness of 1.5 mm was manufactured by extruding the mixture using a twin screw extruder at 200° C. to 240° C.

Examples 2 and 3 and Comparative Examples 1 to 4

A joining material for laser welding was manufactured in the same manner as in Example 1, except that each of the inorganic fillers in the following Table 1 was used, and the mixture was mixed at the content in the following Table 2.

Comparative Examples 5 and 6

A joining material for laser welding was manufactured in the same manner as in Example 1, except that an ethylene-propylene copolymer (A2) having a melt index of 10 g/10 min as measured at a temperature of 230° C. and a load of 2.16 kg and an ethylene-propylene copolymer (A3) having a melt index of 130 g/10 min as measured at a temperature of 230° C. and a load of 2.16 kg were used in Comparative Example 5 and Comparative Example 6, respectively, and the mixture was mixed at the content in the following Table 2.

FIGS. 4 to 8 are scanning electron microscope (SEM) images of Inorganic Filler (C1) to Inorganic Filler (C5), respectively.

The aspect ratios of Inorganic Filler (C1) to Inorganic Filler (C5) were calculated from the SEM images, and the results thereof are shown together in the following Table 1.

TABLE 1

|  | Inorganic Filler (C1) | Inorganic Filler (C2) | Inorganic Filler (C3) | Inorganic Filler (C4) | Inorganic Filler (C5) |
|---|---|---|---|---|---|
| Formula | $CaSiO_3$ | $Mg_5H_2(SiO_3)_4$ | $Mg_5H_2(SiO_3)_4$ | $Mg_5H_2(SiO_3)_4$ | $MgSO_4 \cdot 5Mg(OH)$ |
| Aspect ratio (l/w) | Needle-shaped (10:1~20:1) | Plate-like (1:1~4:1) | Plate-like (1:1) | Plate-like (1:1) | Whisker (20:1~40:1) |
| Width (w) (μm) | 5 ± 3 | 10 ± 5 | 6 ± 1.5 | 4.5 ± 1.5 | 0.5 ± 0.5 |
| Length (l) (μm) | 30~40 | 10~20 | 6 ± 1.5 | 4.5 ± 1.5 | 20~30 |

TABLE 2

|  |  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Polypropylene resin | A1 | 65.2 | 70.2 | 75.2 | 65.2 | 65.2 | 65.2 | 65.2 |  |  |
|  | A2 |  |  |  |  |  |  |  | 65.2 |  |
|  | A3 |  |  |  |  |  |  |  |  | 65.2 |
| Thermoplastic elastomer | B1 | 10 | 5 |  | 10 | 10 | 10 | 10 | 10 | 10 |
|  | B2 | 10 | 10 | 10 | 10 | 10 | 10 | 10 | 10 | 10 |
| Inorganic filler | C1 | 14.8 | 14.8 | 14.8 |  |  |  |  | 14.8 | 14.8 |
|  | C2 |  |  |  | 14.8 |  |  |  |  |  |
|  | C3 |  |  |  |  | 14.8 |  |  |  |  |
|  | C4 |  |  |  |  |  | 14.8 |  |  |  |
|  | C5 |  |  |  |  |  |  | 14.8 |  |  |

Thereafter, physical properties of the joining material for laser welding in Examples 1 to 3 and Comparative Examples 1 to 6 were measured by the following methods.

Measurement of Tensile Strength

A sample having a thickness of 6.4 mm was manufactured, and a tensile strength was measured at a rate of 50 mm/min by applying force to both ends of the sample using a tensile strength tester.

Measurement of Flexural Modulus and Bending Strength

In accordance with ASTM D790, a sample having a thickness of 6.4 mm was manufactured, and the flexural modulus and the bending strength were measured at a rate of 10 mm/min by applying force to the center of the sample.

Measurement of Laser Transmittance

The transmittance of the sample was measured at each wavelength by using a UV-Vis-NIR (ultraviolet-visible light-near infrared) spectrometer (Solid spec). In this case, the transmittance may be calculated as a ratio of laser by measuring the output of laser passing through the sample with respect to the output value of laser wavelength to be used, and a transmittance at 980 nm may be measured by the same method.

The following Table 3 shows physical properties of the joining material for laser bonding according to Examples 1 to 3 and Comparative Examples 1 to 6.

and then an impact strength was measured, and the results thereof are shown in the following Table 4.

TABLE 4

|  | Example 1 | Comparative Example 5 | Comparative Example 6 |
|---|---|---|---|
| Impact strength (MPa) (10 mm/min) | 174 | 546 | 158 |

As in Table 4, it can be seen that the impact strength of the joining material for laser welding varies depending on the melt index of the polypropylene resin.

Specifically, it can be seen that Comparative Example 5 in which the melt index of the polypropylene resin is 10 g/10 min does not have physical properties suitable for being used as a joining material for laser welding because the impact strength is rapidly increased, but the flexural modulus is decreased as compared to Examples 1 to 3 as in Table 3. Further, it can be seen that Comparative Example 6 in which the melt index of the polypropylene resin is 130 g/10 min does not have physical properties suitable for being used as a joining material for laser welding because the

TABLE 3

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Tensile strength (MPa) (50 mm/min) | 21.5 | 23.8 | 26.8 | 22.1 | 21.3 | 20.4 | 24.5 | 20.2 | 20.4 |
| Flexural modulus (MPa) (10 mm/min) | 2420 | 2750 | 3030 | 2140 | 1880 | 1680 | 3290 | 2030 | 2480 |
| Bending strength (MPa) (10 mm/min) | 33.4 | 38 | 42.4 | 34 | 32.5 | 31.4 | 37.3 | 29.3 | 32.2 |
| Laser transmittance (%) (@980 nm) | 29.03 | 29.3 | 29.89 | 18.99 | 31.89 | 37.39 | 46.35 | 28 | 29.1 |

According to Table 3, it was confirmed that in Examples 1 to 3, the tensile strengths, flexural moduli, and bending strengths had tensile strengths, flexural moduli, and bending strengths suitable for being used in the laser joined body likewise in Comparative Examples 1 to 6. That is, when the joining materials for laser welding are manufactured at a content in each of Examples 1 to 3, the welding strength during the laser welding may be improved without impairing the tensile strength, flexural modulus, and bending strength.

Furthermore, the laser transmittance corresponds to a physical property varying depending on the inorganic filler, and in the case of having a laser transmittance at a suitable level, the welding strength of the laser welding may be improved without impairing physical properties of the joining material for laser welding.

Measurement of Impact Strength

In accordance with the ASTM D256 method, the impact strengths of the joining materials for laser welding in Example 1 and Comparative Examples 5 and 6 were measured by an izod impact tester for hard plastics (measurement of IZOD, Toyoseiki Co., Ltd.).

The size of the sample was 64 mm×12.5 mm×6.36 mm, a 25.4-mm notch was formed by using a notching machine, flexural modulus is similar to those of Examples 1 to 3, but the impact strength is decreased.

Thereafter, the following experiment was performed in order to measure the welding strength of laser welding according to the type of inorganic filler and the welding strength of laser welding according to the melt index of the polypropylene resin.

Measurement of Welding Strength

A material to be joined having the same composition as in Example 1 and including carbon black in an amount of 0.3 part by weight based on the total weight was manufactured.

After each of the joining materials for laser welding manufactured according to Examples 1 to 3 and Comparative Examples 1 and 4 was placed on the material to be joined, the joining material for laser welding was fixed by using a jig. Furthermore, a laser joined body was manufactured by performing laser welding using a diode laser (ELED-100RD). The upper limit output of the laser, the laser wavelength, and the just focus size were 110 W, 980 nm, and 1.6 mm, respectively.

Figure 9:
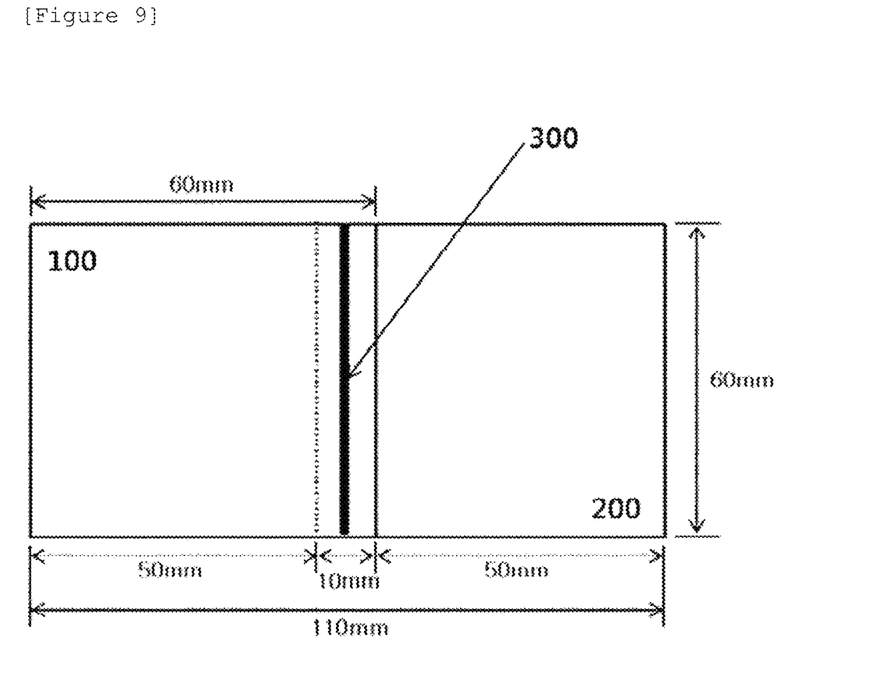
FIG. 9 is an illustration of a laser joined body sample during measurement of welding strength according to an exemplary embodiment.

FIG. 9 illustrates a laser joined body sample during the measurement of welding strength. Specifically, FIG. 9 illustrates that a welding region 300 is formed and joined through laser irradiation after a partial region on a material to be joined 200 is laminated with a manufactured joining material for laser welding 100.

The laser welding condition was set to a total line energy of 1.8 J/mm (conditions: an output of 80 W, an irradiation rate of 180 mm/s, and the number of repetitions of 4 times), and the corresponding welding strength (attachment force) was measured and is shown in the following Table 5.

Figure 10:
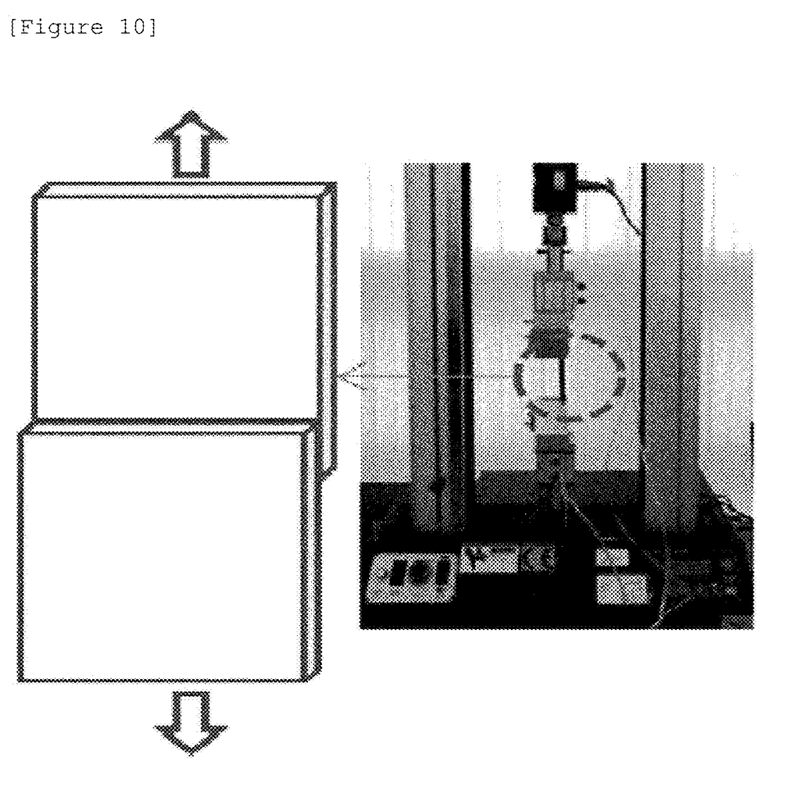
FIG. 10 is a photograph of an instrument used to measure welding strength of a laser joined body sample according to an exemplary embodiment.

FIG. 10 is a photograph of the measurement set-up to measure the welding strength of a laser joined body sample. The welding strength may be measured by using a tensile strength tester, and specifically, a force at the time when a joining material for laser welding and a material to be joined were separated by stretching the manufactured laser joined body at a rate of 10 mm/min was measured.

TABLE 5

|  | Example 1 | Example 2 | Example 3 | Comparative Example 1 | Comparative Example 2 | Comparative Example 3 | Comparative Example 4 |
|---|---|---|---|---|---|---|---|
| Welding strength (MPa) | 8.8 MPa | 9.8 MPa | 10.1 MPa | 8.5 MPa | 8.5 MPa | 8.5 MPa | 6.7 MPa |

As can be seen in Table 5, it can be seen that the laser joined bodies using the joining materials for laser welding, which include needle-shaped inorganic fillers having an aspect ratio of 10:1 to 20:1 in Examples 1 to 3 exhibit excellent welding strengths as compared to the laser joined bodies using the joining materials for laser welding according to Comparative Examples 1 to 4 in which the aspect ratio of the inorganic filler is out of the above range. It can be seen that due to the inorganic fillers included in the joining materials for laser welding in Comparative Examples 1 to 4, the laser transmittances are out of a suitable range, and as a result, the welding strength of the laser joined body is reduced.

Further, the joining materials for laser welding and the materials to be joined in Example 1 and Comparative Examples 5 and 6 were laser welded in the same manner as in the process of measuring the welding strength, except that the total line energy was set to 1.5 J/mm (conditions: an output of 60 W, an irradiation rate of 40 mm/s, and the number of repetitions of 1 time), the corresponding welding strength was measured, and the results thereof are shown in the following Table 6.

TABLE 6

|  | Example 1 | Comparative Example 5 | Comparative Example 6 |
|---|---|---|---|
| Welding strength (MPa) | 12.88 | 10.26 | 9.6 |

According to Table 6, it could be confirmed that the laser joined body using the joining material for laser welding in Example 1 had a higher welding strength than those of the laser joined bodies using the joining materials for laser welding in Comparative Example 5 and 6. Accordingly, it can be seen that the joining material for laser welding in Example 1 according to an exemplary embodiment of the present invention also improves the welding strength while having suitable physical properties required for the joining material for laser welding.

As a result, it can be confirmed that the joining material for laser welding according to an exemplary embodiment of the present invention secures a tensile strength, a flexural modulus, a bending strength, and an impact strength suitable for being used as a joining material for laser welding, and improves the welding strength of the laser joined body during the laser welding.

REFERENCE NUMERALS AND SYMBOLS USED HEREIN

100: Joining material for laser welding
200: Material to be joined
300: Welding region

The invention claimed is:

1. A joining material for laser welding, the joining material comprising:
a polymer matrix comprising a polypropylene resin having a melt index of 80 g/10 min or more to 95 g/10 min or less as measured at a temperature of 230° C. and a load of 2.16 kg; and
a needle-shaped inorganic filler having an aspect ratio of 10:1 to 20:1,
wherein the joining material has a light transmittance of 20% or more and 30% or less at a wavelength of 980 nm.

2. The joining material of claim 1, wherein the polymer matrix further comprises a thermoplastic elastomer.

3. The joining material of claim 2, wherein the thermoplastic elastomer comprises a block copolymer of ethylene and an α-olefin having 4 to 30 carbon atoms.

4. The joining material of claim 3, wherein a molar ratio of the ethylene to the α-olefin is 6:4 to 7:3.

5. The laser joining material of claim 3, wherein the α-olefin having 4 to 30 carbon atoms comprises at least one α-olefin selected from the group consisting of 1-butene, 1-pentene, 4-methyl-pentene, 1-hexene, 1-heptene, 1-octene, 1-decene, 1-undecene, 1-dodecene, 1-tetradecene, 1-hexadecene, and 1-eicosene.

6. The joining material of claim 2, wherein the thermoplastic elastomer has a melt index of 0.5 g/10 min or more to 10 g/10 min or less as measured at a temperature of 190° C. and a load of 2.16 kg.

7. The joining material of claim 2, wherein the thermoplastic elastomer is present in an amount of 5 parts or more by weight to 30 parts or less by weight based on 100 parts by weight of the joining material.

8. The joining material of claim 1, wherein the polypropylene resin comprises at least one selected from the group consisting of a propylene homopolymer, an ethylene-propylene copolymer, a copolymer of propylene and an olefin-based monomer having 4 to 10 carbon atoms, and a block copolymer of polypropylene and an ethylene-propylene rubber.

9. The joining material of claim 8, wherein, when the polypropylene resin is an ethylene-propylene copolymer, a content of an ethylene repeating unit of the ethylene-propylene copolymer is 3 wt % or more to 10 wt % or less.

10. The joining material of claim 1, wherein the needle-shaped inorganic filler is present in an amount of 5 parts or more by weight to 30 parts or less by weight based on 100 parts by weight of the joining material.

11. The joining material of claim 1, wherein the joining material has a thickness of 0.5 mm or more to 5 mm or less.

12. The laser joining material of claim 1, wherein the needle-shaped inorganic filler is selected from the group consisting of magnesium oxysulfate-based particles, magnesium silicate hydrate-based particles and calcium silicate-based particles.

13. A laser welding method comprising:
laminating the joining material according to claim 1 and at least a part of a material to be joined; and
irradiating a region where the joining material and the material to be joined are laminated with a laser to form a welding region,
wherein the laser passes through the joining material toward a surface of the material to be joined.

14. The method of claim 13, wherein a total line energy of the laser is 1.5 J/mm or more to 3 J/mm or less, wherein the total line energy is defined by Equation 1:

$$E_{tot}=P/v\times \text{the number of repetitions, and} \quad\quad 1$$

wherein in Equation 1, $E_{tot}$ is the total line energy (J/mm), P is a laser power (W), and v is a laser irradiation rate (mm/s).

15. A laser joined body manufactured by using the laser welding method according to claim 13.

* * * * *